(12) United States Patent
Hurter

(10) Patent No.: US 12,452,979 B2
(45) Date of Patent: Oct. 21, 2025

(54) MULTIPLE LIGHTING MODE LED LAMP

(71) Applicant: Kupa, Inc., Anaheim, CA (US)

(72) Inventor: Richard B. Hurter, Castaic, CA (US)

(73) Assignee: Kupa, Inc., Anaheim, CA (US)

( * ) Notice: Subject to any disclaimer, the term of this patent is extended or adjusted under 35 U.S.C. 154(b) by 0 days.

(21) Appl. No.: 18/611,537

(22) Filed: Mar. 20, 2024

(65) Prior Publication Data

US 2024/0334572 A1 Oct. 3, 2024

Related U.S. Application Data

(60) Provisional application No. 63/492,990, filed on Mar. 29, 2023.

(51) Int. Cl.
*H05B 47/13* (2020.01)
*A45D 29/00* (2006.01)
(Continued)

(52) U.S. Cl.
CPC ............... *H05B 47/13* (2020.01); *F21S 9/02* (2013.01); *F21V 21/32* (2013.01);
(Continued)

(58) Field of Classification Search
CPC .... A45D 2200/205; A45D 29/00; H05B 7/13; H05B 7/16; H05B 45/10; F21V 23/0471; F21V 23/085; F21S 9/02
See application file for complete search history.

(56) References Cited

U.S. PATENT DOCUMENTS 6,948,831 B1 * 9/2005 Naqvi ................. F21S 8/02
362/802
8,993,983 B2 3/2015 Li et al.
(Continued)

FOREIGN PATENT DOCUMENTS

CN 201014235 Y 1/2008
CN 203969578 U 12/2014
(Continued)

OTHER PUBLICATIONS

Melodysusie, S-Pro09M, Jun. 1, 2022 (date established by publication date of embedded youtube video), MelodySusie.com, https://www.melodysusie.com/products/2-in-1-uv-led-nail-art-lamp?srsltid=AfmBOoogWoBjTd7eL4VX8vHQ-xlmGAwglc_Wi3w_CvyurOntz-9RBI5I, (Year: 2022).*
MelodySusie Official, "MelodySusie 2 in 1 Nail Art Lamp to Revolutionize Your Manicure Journey" (screencapture), Jun. 1, 2022, youtube.com, https://www.youtube.com/watch?v=I5JqBGz9f-E (Year: 2022).*
(Continued)

*Primary Examiner* — Matthew J. Peerce
(74) *Attorney, Agent, or Firm* — STETINA GARRED BRUCKER & NEWBOLES

(57) ABSTRACT

The disclosed device relates to a multiple lighting mode LED lamp. The lamp has an LED assembly with a plurality of white LEDs for a first illumination source, and a plurality of UV LEDs for a second illumination source. The LED assembly is attached to the first end of a flexible support, and a base is attached to the second end of the flexible support. The lamp base incorporates an LED driver module in electrical communication with the illumination sources. A manual touch switch in the base, when touched by a user activates the white LEDs to operate the lamp in a lighting mode. A motion sensor in the form of an infrared induction sensor, is incorporated into the face of the LED assembly for detecting motion. Upon motion being detected, the UV LEDs are activated for a predetermined period of time to operate in UV light mode.

29 Claims, 6 Drawing Sheets

(51) Int. Cl.

| | |
|---|---|
| *F21S 9/02* | (2006.01) |
| *F21V 21/32* | (2006.01) |
| *F21V 23/04* | (2006.01) |
| *F21Y 105/18* | (2016.01) |
| *F21Y 113/00* | (2016.01) |
| *F21Y 115/10* | (2016.01) |
| *H05B 45/10* | (2020.01) |
| *H05B 47/16* | (2020.01) |

(52) U.S. Cl.
CPC ...... *F21V 23/0471* (2013.01); *F21V 23/0485* (2013.01); *H05B 45/10* (2020.01); *H05B 47/16* (2020.01); *A45D 29/00* (2013.01); *A45D 2200/205* (2013.01); *F21Y 2105/18* (2016.08); *F21Y 2113/30* (2023.05); *F21Y 2115/10* (2016.08)

(56) References Cited

U.S. PATENT DOCUMENTS

| | | | |
|---|---|---|---|
| 9,115,857 B2 * | 8/2015 | Beausoleil | F21V 21/14 |
| 9,351,555 B2 | 5/2016 | Li et al. | |
| 9,625,111 B2 | 4/2017 | Zhang et al. | |
| 9,707,537 B2 | 7/2017 | Haile | |
| 9,810,479 B2 | 11/2017 | Haile et al. | |
| 9,855,543 B2 | 1/2018 | Haile | |
| 9,894,975 B2 | 2/2018 | Huang | |
| 10,016,043 B1 | 7/2018 | Cheng | |
| 10,247,475 B2 | 4/2019 | Valia et al. | |
| 10,264,866 B1 | 4/2019 | Luu | |
| 10,393,433 B2 | 8/2019 | Valia et al. | |
| 10,408,537 B2 | 9/2019 | Haile et al. | |
| 10,506,861 B1 | 12/2019 | Ma | |
| 10,827,815 B1 | 11/2020 | Tan et al. | |
| 10,876,791 B2 | 12/2020 | Valia et al. | |
| D914,982 S | 3/2021 | Hurter | |
| 11,330,886 B2 | 5/2022 | Ly | |
| 11,369,180 B1 | 6/2022 | Khanh | |
| 11,540,374 B1 | 12/2022 | Tan et al. | |
| 11,641,919 B2 | 5/2023 | Vu et al. | |
| 11,969,068 B2 | 4/2024 | Hurter | |
| 2009/0161374 A1 | 6/2009 | Teng et al. | |
| 2009/0236481 A1 | 9/2009 | Chen | |
| 2010/0293805 A1 | 11/2010 | Chang | |
| 2011/0277338 A1 | 11/2011 | Li et al. | |
| 2012/0060757 A1 | 3/2012 | Li et al. | |
| 2013/0134447 A1 | 5/2013 | Pan et al. | |
| 2015/0082654 A1 | 3/2015 | Jaegal et al. | |
| 2015/0290675 A1 | 10/2015 | Lin | |
| 2016/0095409 A1 | 4/2016 | Jih | |
| 2017/0006993 A1 | 1/2017 | Rivero et al. | |
| 2017/0127790 A1 | 5/2017 | Huang | |
| 2018/0302967 A1 | 10/2018 | Hsieh et al. | |
| 2019/0307223 A1 | 10/2019 | Coefield | |
| 2020/0237071 A1 | 7/2020 | Lee | |
| 2021/0022473 A1 | 1/2021 | Hurter | |
| 2021/0112941 A1 * | 4/2021 | Tan | H05G 2/00 |
| 2021/0161271 A1 * | 6/2021 | Cheng | A45D 29/00 |

FOREIGN PATENT DOCUMENTS

| | | |
|---|---|---|
| CN | 305423338 | 11/2019 |
| DE | 202006015288 U1 | 1/2007 |
| EP | 3769643 | 1/2021 |
| JP | 2016119264 A | 6/2016 |
| TW | M549557 | 10/2017 |
| WO | 2013149156 | 10/2013 |

OTHER PUBLICATIONS

"LED UV Nail Lamp for Gel Nails", https://www.amazon.com/LXIANGN-Rotatable-Gooseneck-Polish-Manicure/dp/B09X19MWTK?th=1, retrieved Jun. 20, 2024, 7 pages, Amazon.com.

"Manipro Glo Soft Gel Lamp + Mani Bundle", https://kupainc.com/products/manipro-glo-soft-gel-table-lamp?_pos=1&_sid=807c6d049&_ss=r, Nov. 2022, retrieved Jul. 7, 2023, 2 pages, Kupa, Inc.

Kupa, Inc. Website, "UV/LED Hybrid Lamp—WHT.," https://kupainc.com/products/gelfinity-uv-led-hybrid-lamp-white, publication date unknown, site visited Jul. 27, 2020.

Soto Salvador, Jesus, "Extended European Search Report", European Patent Application No. EP24166600.7, Aug. 13, 2024, 12 pages, European Patent Office, Germany.

* cited by examiner

MULTIPLE LIGHTING MODE LED LAMP

CROSS-REFERENCE TO RELATED APPLICATIONS

The present application claims the benefit of U.S. Provisional Application No. 63/492,990, filed Mar. 29, 2023, the contents of which are expressly incorporated herein by reference.

STATEMENT RE: FEDERALLY SPONSORED RESEARCH/DEVELOPMENT

Not Applicable

BACKGROUND

Technical Field

The present inventive subject matter relates generally to a multipurpose lamp for operating in a first mode as lamp for lighting a workspace or desk and for operating in a second mode as a UV LED lamp mode for nail salons. More particularly, while the lamp operates in the first mode using white light emitting diodes (LEDs), the second UV LED lamp mode may be activated for curing nail gel and related articles by placing a hand under the lamp diffuser causing detection by a motion sensor and activating UV LEDs for a predetermined period of time.

Background

Nail care service providers such as nail salons provide services related providing manicures and pedicures. Typically, as part of the manicure and pedicure services, service providers and/or nail technicians may apply or coat their customer's fingernails and toenails with nail gel, artificial nails and/or nail polish. Many of the nail finishes require drying or curing for the best results, and as such, nail gel curing devices, generally known as gel curing lamps have become standard equipment in today's nail salons for exposing nails to drying and curing lights.

One such device is the KUPA® gelfinity curing lamp which has been offered by Kupa, Inc. of Anaheim, CA. The KUPA gelfinity is a 36 Watt UV/LED lamp that cures both UV and LED products. A built-in timer allows the user to select to adjust drying or curing times depending on the length of desired drying or curing time. A motion detector in the gel curing lamp may provide activation of the lamp when the device senses a user has inserted a hand or foot into an opening for curing or drying. See also United States Patent Publication No. US 2021/0022473 published Jan. 28, 2021 to Hurter, the entire substance of which is incorporated herein by reference. See also United States Patent Publication No. US 2018/0302967 entitled Slow Start Photocuring Device and Switch Control Module published Oct. 18, 2018 to Hsieh, et al., the entire substance of which is incorporated herein by reference.

Nail technicians may apply intricate designs to nail surfaces requiring the need to view the nail surfaces using a localized light source. A separate light source such as gel lamp, is required for curing of the nail surface which takes up work surface area on the technician's workspace requires a separate power source. As such, there is a need for localizing and/or combining the attributes of a light source for the technician as well as gel curing attributes of a gel curing lamp into a single unit.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

BRIEF SUMMARY

The inventive subject matter described herein demonstrates a multiple lighting mode LED lamp. The lamp has an LED assembly with a plurality of white LEDs for a first illumination source, and a plurality of UV LEDs for a second illumination source. For example, the LED assembly may comprise a circular arrangement of nine (9) white light LEDs along with (3) UV LEDs centered within the circular arrangement of the white light LEDs.

The LED assembly is attached to the first end of a flexible support, and a base is attached to the second end of the flexible support. The flexible support extends upwardly from the base, allowing the user to move the LED assembly to selectively aim emitted light from the LEDs.

The lamp incorporates an LED driver module in electrical communication with white and UV LEDs. The LED driver module is located in the lamp base. However, LED driver module may also be located in, the lamp support or in the lamp LED assembly. The LED driver module is also electrically interconnected to a power source and manual switch or button. The power source may be a rechargeable battery so that the LED lamp can be used untethered from a power outlet. A charging port is incorporated into the base to facilitate charging of a rechargeable battery. A manual switch or button is provided within the base to allow a user to activate the lamp by pressing the button. When the button is pressed, a signal is sent to the LED driver module to activate LEDs in the lamp. The button or switch may also comprise a touch sensor that generates a signal to the LED driver module upon a user touching the surface of the touch sensor. In operation when a user activates the button or switch a signal is sent to the LED driver module to activate the white LEDs to operate the lamp in a lighting mode. The LED driver module may adjust the intensity of the white light LEDs based on the number of activations of the switch. For example, the LED driver module drives the first illumination source of white LEDs at 30% intensity with one activation of the switch, 60% intensity with two activation of the switch and 100% intensity with three activations of the switch.

A motion sensor in the form of an infrared induction sensor, is incorporated into the face of the LED assembly for detecting motion. Upon motion being detected, the UV LEDs are activated for a predetermined period of time. For example, the UV LEDs may be activated by the motion sensor in communication with the LED driver module to activate the UV LEDs for approximately fifteen seconds. While the example shows the motion sensor being located on the underside of the LED assembly, it is recognized and contemplated that the motion sensor can be placed at a location on the lamp that will permit the lamp user to active the UV LEDs with a simple motion proximal to the lamp to activate an LED mode of the lamp.

In operation, a user, such as a nail technician or nail artist may use the disclosed LED lamp for lighting at a desk or work surface during a manicure or pedicure session. Upon applying a nail finish, such as soft gel tips, line art gel, or jewel/stone applications, a nail technician may direct his or her own hand, or the hand or foot of the person being manicured, to a location under the LED assembly of the lamp to cause the motion detector to sense motion and to therefore initiate the UV LEDs. The UV LEDs are used in gel curing and are activated for a predetermined period of time. This allows the nail technician to be able to complete a spot curing of gel, without the need to deploy a separate gel curing lamp. The nail technician may rely on the automatic timing of the UV LED shut off without having to keep time separately. This non-contact activation and automated timing allows for the nail technician to continue working on the manicured hand or foot without having put down working implements such as gel brushes when switching from application to gel curing. The outer surface of the base of the LED lamp may have an acetone resistant finish.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
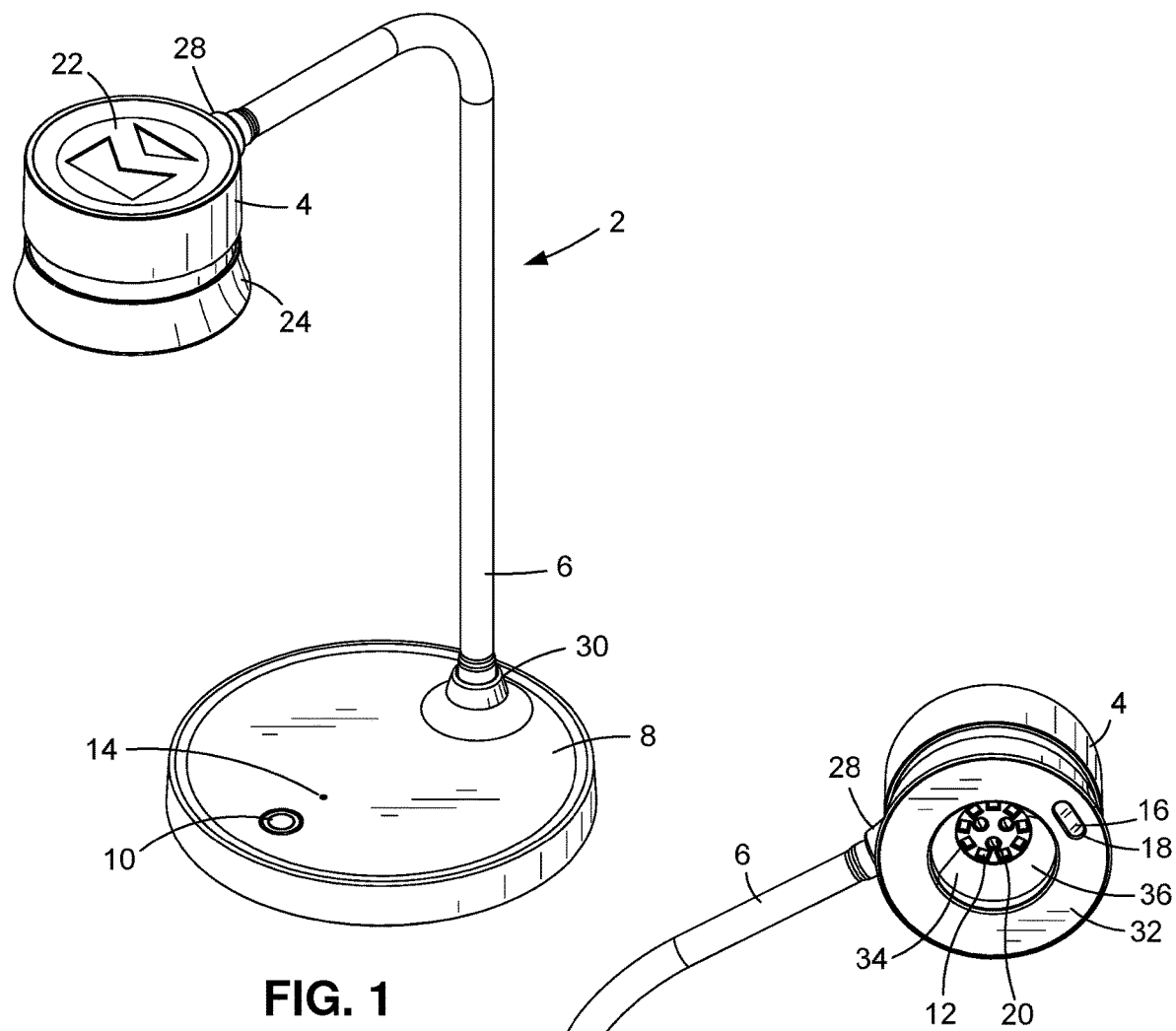
FIG. 1 is a front perspective view of the LED lamp disclosed herein.

The detailed description set forth below in connection with the appended drawings is intended as a description of certain embodiments of a multipurpose multiple lighting mode LED lamp, system and method and is not intended to represent the only forms that may be developed or utilized. The description sets forth the various structure and/or functions in connection with the illustrated embodiments, but it is to be understood, however, that the same or equivalent structure and/or functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

The background, summary and the above description includes information that may be useful in understanding the present disclosure. It is not an admission that any of the information provided herein is prior art or relevant to the presently claimed inventive subject matter, or that any publication specifically or implicitly referenced is prior art.

In some embodiments, the numbers expressing dimensions, quantities, quantiles of ingredients, properties of materials, and so forth, used to describe and claim certain embodiments of the disclosure are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the disclosure are approximations, the numerical values set forth in the specific examples are reported as precisely as practicable. The numerical values presented in some embodiments of the disclose may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the disclosure and does not pose a limitation on the scope of the claimed inventive subject matter. No language in the specification should be construed as indicating any non-claimed element essential to the practice of the inventive subject matter.

Groupings of alternative elements or embodiments of the inventive subject matter disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed. Various objects, features, aspects and advantages of the inventive subject matter will become more apparent from the following detailed description of preferred embodiments, along with the accompanying drawing figures in which like numerals represent like components.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Figure 2:
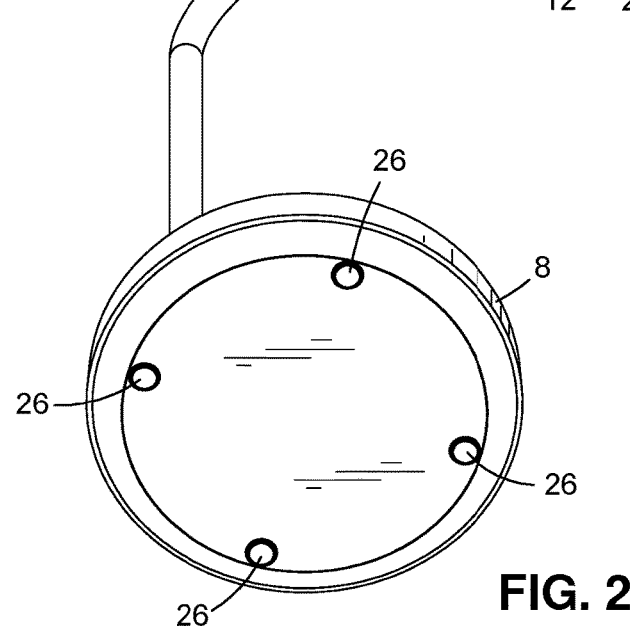
FIG. 2 is a bottom prospective view of the disclosed LED lamp.

Referring particularly to FIGS. 1 and 2, there is shown the LED lamp 2 as disclosed herein. The LED lamp 2 has desk lamp features of a base 8 coupled to an elongate flexible support 6 for supporting an LED light housing 4. The flexible support 6 permits the LED light housing 4 to be directed in numerous direction and angles. The LED light housing 4 may also be referred to herein and throughout this disclosure as an LED assembly. The flexible support may be formed of from any flexible material or mechanism as is known. The flexible support 6 may be made of iron wire tube coated with nickel and wrapped with a silicone sleeve. Other like materials may be utilized that provide support for the LED housing 4, but also which is flexible for positioning of the LED housing 4. The base 8 incorporates an activation switch or button 10 for initiating the white LED lights 12 incorporated into the LED light housing 4. The button 10 is a push button that initiates a switch function. It is contemplated by the current disclosure that the button 10 may be a push button or touch sensor. In operation, the button 10 is held down for a predetermined period of time such as one and a half second or alternatively three seconds to turn on or initiate the white LEDs 12. Upon the first activation the button 10, the white LEDs illuminate at 30% intensity. A further activation of the button, being the second push or touch, illuminates the white LEDs 12 at 60% intensity. A third activation of the button 10, being a third push or touch, illuminates the white LEDs at 100% intensity. While the white LEDs 12 are illuminated at any intensity, holding down the button for a predetermined period of time such as one and a half seconds or alternatively three seconds, the white LEDs will turn off the white LEDs. The LED white lights 12 as shown in the drawings in various figures represented as having a square shape, however, any white light LED regardless of shape is contemplated by this disclosure. The white light LEDs 12 are 3V, 0.5 W LEDs in the color range of approximately 6000 k-6500 k with an angle of 120 degrees. As shown in the drawings, there are nine white light LEDs 12, formed concentrically around the center of the bottom of the LED light housing 4. The LED intensity of the White LEDs 12 for purposes of this disclosure describes that for the nine LEDs of the white LEDs 12, 30% means that three of the nine white LEDs 12 are illuminated, 60% means that six of the nine white LEDs 12 are illuminated and 100% means that all nine of the white LEDs 12 are illuminated. Alternatively, it is contemplated by this disclosure that the white LEDs 12 intensity may be determined by the amount of power supplied to the white LEDs 12 via LED driver module 72, where all nine white LEDs 12 are illuminated, but at varied degrees of intensity. Although nine white LEDs 12 are shown, it is contemplated any number of white LEDs can be placed to provide a light source and can be arranged in any pattern. Also, although white LEDs 12 are disclosed, LEDs of differing colors are contemplated by this disclosure. An LED indicator light 14 is included in the base 8 to indicate the charge status of a battery (not shown in FIG. 2). For example, the LED 14 may turn solid red if there is no power. In addition, the LED 14 may flash on and off when the battery level reaches 20 percent power or lower, to indicate a recharge is required. The LED 14 may change to green upon reaching a full charge.

A motion sensor (not shown in FIGS. 1 and 2) in the form of an infrared induction sensor, is incorporated into the face 32 of the LED light housing 4 which detects motion through motion sensor window 16 which may be formed of a transparent plastic or other like material placed in an aperture 18 to permit the motion sensor to detect motion in front of the lower face 32 of the LED light housing 4. Upon motion being detected, the UV LEDs 20 are activated for a predetermined period of time. For example, the UV LEDs 20 may be activated by the motion sensor in communication with the LED driver module to activate the UV LEDs 20 for approximately fifteen seconds. While the example shows the motion sensor being located on the underside of the LED housing 4, it is recognized and contemplated that the motion sensor can be placed at a location on the lamp that will permit the lamp user to activate the UV LEDs 20 with a simple motion detected by a motion sensor.

The base 8 and the LED light housing 4 may be constructed of, or coated by an acetone resistant surface as acetone is regularly used in nail salons and may come into contact with the LED lamp 2. The circular base 8 may be of sufficient width and weight as to be an effective counterbalance to the support 6 and lamp housing 4 to keep the LED lamp 2 in an upright position for use on a desk or other surface. Surface skids 26 (not shown in FIG. 1) are applied to the bottom of the base 8 to limit movement or sliding of the lamp 2 during use. The support 6 is received and coupled to the base 8 through an opening 30.

The LED light housing 4 is a generally cylindrical shape with an upper face 22 with a flared side wall 24. The support 6 is received and attached to the housing 4 through raised opening 28. The light housing 4 has a circular lower face 32 incorporating the aperture 18 to be in alignment with the motion sensor (not shown in FIGS. 1 and 2). The circular lower face 32 has an opening 34 and tapered interior walls 36 that encircle the LEDs 12 and UV LEDs 20 which are recessed from the lower face 32. The interior walls 36 may have a reflective coating to enhance the light emitted from LEDs 12 and UV LEDs 20. The recessed location of the LEDs 12 and 20 aid in directing any emitted light toward the direction of the lower face 32, and to limit light emitting laterally from the housing 4.

Figure 3:
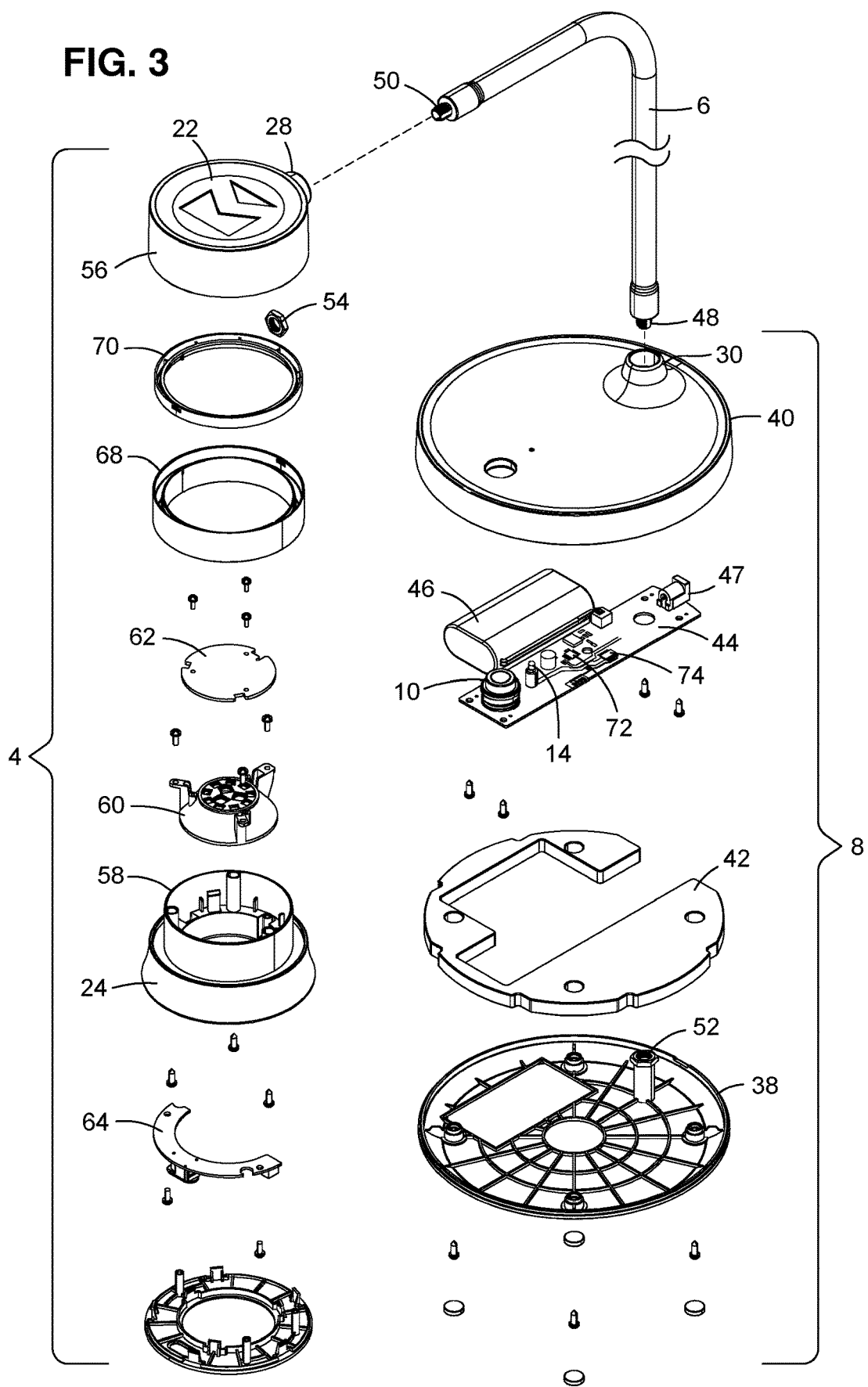
FIG. 3 is an exploded top perspective view of the LED lamp of FIG. 1.
Figure 4:
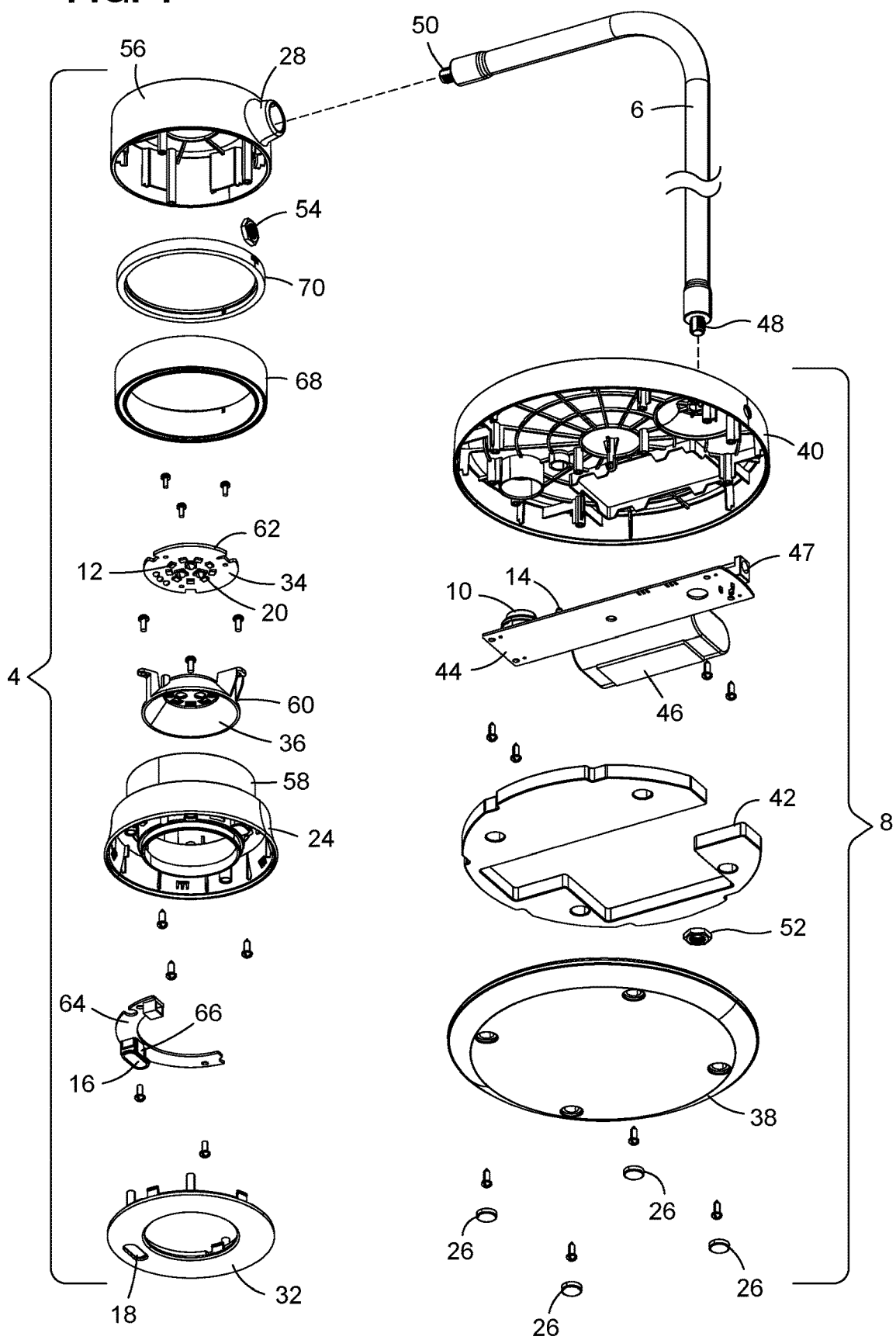
FIG. 4 is an exploded bottom perspective view of the LED lamp of FIG. 2.
Figure 5:
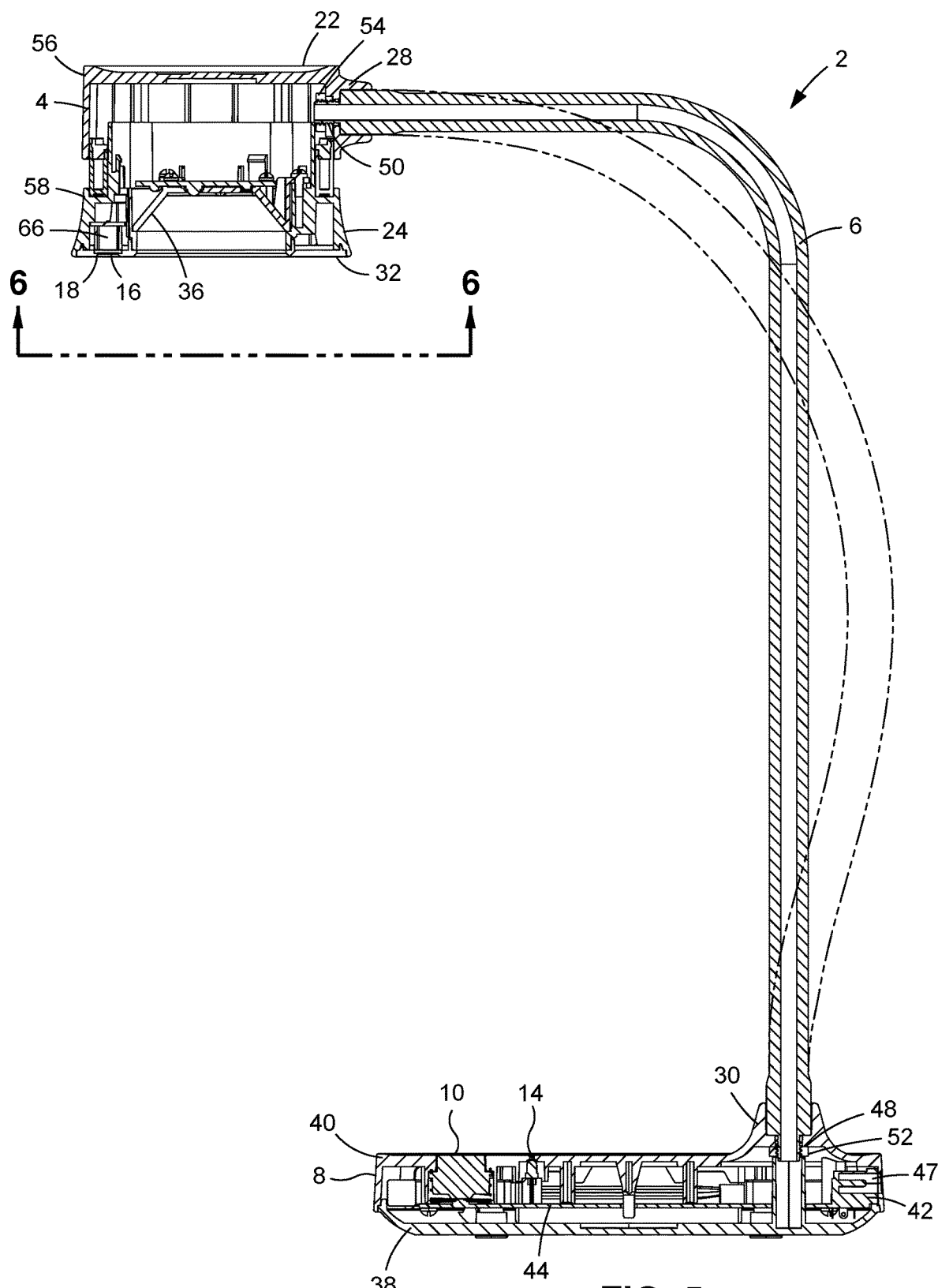
FIG. 5 is a cross sectional side view of the disclosed LED lamp.

Referring particularly to FIGS. 3-5, in FIGS. 3-4 there are shown exploded views of both the LED light housing 4 and the base 8, showing component parts, along with the support 6 with FIG. 5 shows a cross sectional view of the lamp 2. The base 8 is formed from component parts including bottom plate 38 and top cover 40. The bottom plate 38 and top cover 40 forming an outer housing of the base 8. Within the base 8 housing a platform 42 that supports inner components such as PCB 44 and battery 46. The battery 46 nests in the platform 42. The switch or button 10, the LED indicator light 14 and charging port 47 are all attached and electrically coupled to the PCB 44. The PCB 44 may additionally support an LED driver module 72 and be electrically connected to the support 6, that has electrical pathways (not shown) through the support 6 to supply power and/or electrical signals to the LED components of the LED housing 4, namely the white light LEDs 12 and the UV LEDs 20. The PCB 44 may also support a charging and power manager IC 74, that is in electrical connection to the battery 46 and additionally operates to provide power to the various electronic components on the PCB 44 and LEDs in the lamp housing 4. The support 6 has first threaded end 48 and second threaded end 50. The threads of end 48 are received through the opening 30 and threaded into a nut 52 and the threads of end 50 are received through opening 28 threaded into nut 54.

The LED light housing 4 is formed from component parts including top cap 56 and bottom shroud 58 that includes the sloping sidewalls 24. Received within the shroud 58 is a cup shaped recess 60, having the sloping inner wall 36, and at the base a plurality of openings that provide openings to align with LEDs 12 and UV LEDs 20 that are formed on a LED PCB 62. A semi-circular sensor PCB 64 is positioned behind the face of the circular lower face 32 and supports a motion sensor 66 that allows the sensor 66 to be in alignment with aperture 18. Inner rings 68 and 70 provide spacing and allow interconnections of the components of the LED light housing 4. After assembly of rings 68 and 70 the connection is completed through the assembly of housing 4 and sidewalls 24.

Figure 6:
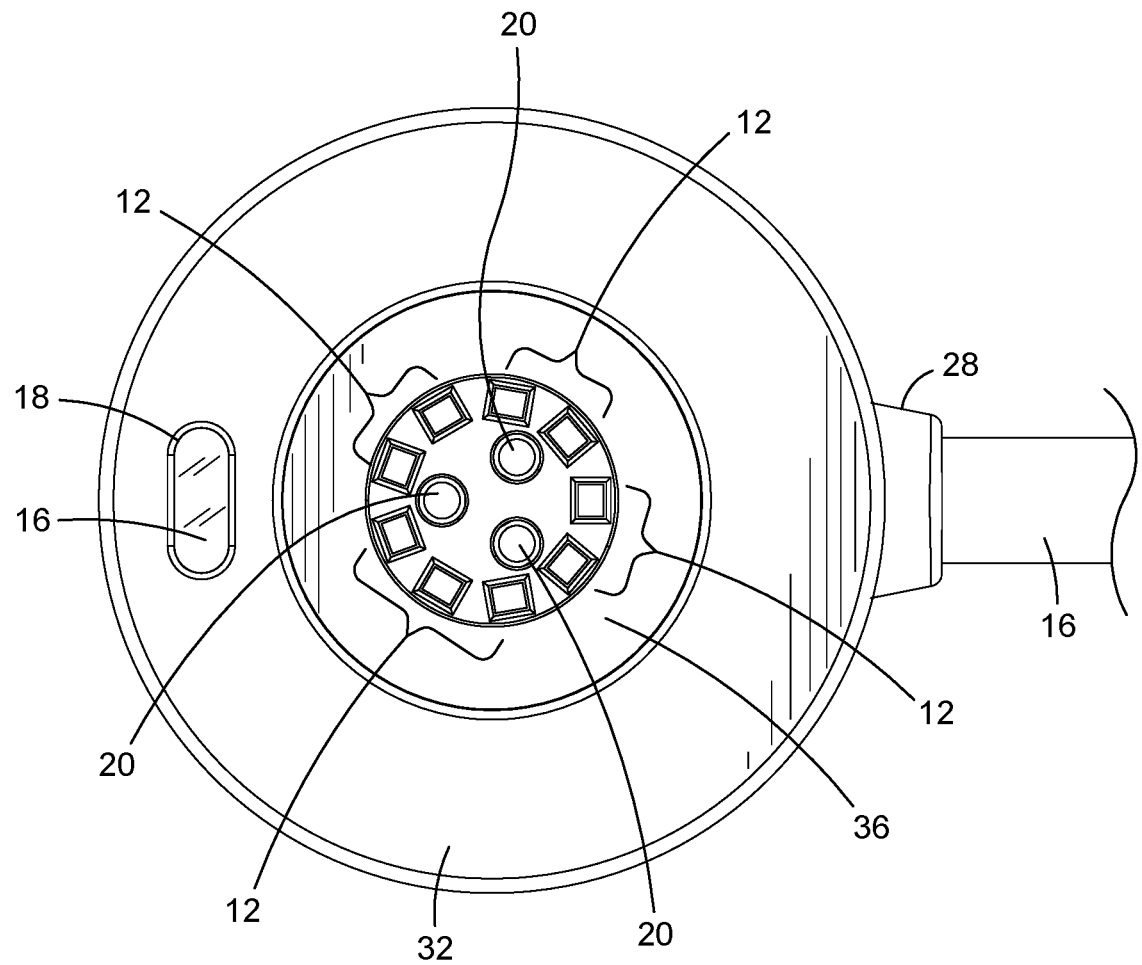
FIG. 6 is a bottom view of the LED assembly of the disclosed LED lamp.

Referring particularly to FIG. 6, there is shown the lower face of the LED light housing 4, showing the arrangement of LEDs 12 and 20. The LEDs 12 are white light LEDs formed in a circular arrangement with nine (9) LEDs within a recess having sloping walls 36. The walls 36 may include a reflective coating or surface that enhances the light emitted from LEDs 12 and 20. Three UV LEDs 20 are located within the circular arrangement of white LEDs to emit UV light when activated. As indicated the UV LEDs 20 activate for a period of 15 seconds. The LED driver module 72 controls operation of the UV LEDs 20 for the period of time. A motion sensor 66 (shown in FIGS. 3,-5 and 7) in the form of an infrared induction sensor, is incorporated into the face 32 of the LED light housing 4 which detects motion through motion sensor window 16 which may be formed of a transparent plastic or other like material placed in an aperture 18 to permit the motion sensor to detect motion in front of the lower face 32 of the LED light housing 4. Upon motion being detected, the UV LEDs 20 are activated for a predetermined period of time. For example, the UV LEDs 20 may be activated by the motion sensor in communication with the LED driver module to activate the UV LEDs 20 for approximately fifteen (15) seconds. While the example shows the motion sensor being located on the underside of the LED assembly, it is recognized and contemplated that the motion sensor can be placed at a location on the lamp that will permit the lamp user to active the UV LEDs with a simple motion to activate.

The UV LEDs 20 may have 365 nm and 395 nm dual wavelength dual wave/series connection VF equaling 6.8 to 7.4 V, IF equaling 150 mA and 1 W of power. Although LEDs of the 365 nm and 395 nm wavelengths are disclosed, any suitable wavelength near the wavelength ranges may be used that is effective in curing nail gel. Effective ranges of LED for curing include, but are not limited to, 320 nm to 400 nm and as such LEDs in this range may be utilized. However, different nail gels require different curing wavelengths, and the LEDs could be substituted at different wavelengths to suit gel curing requirements. For example, UV light generally ranges from 100 nm and 400 nm and LEDs in this range may be suitable depending on gel requirements.

Figure 7:
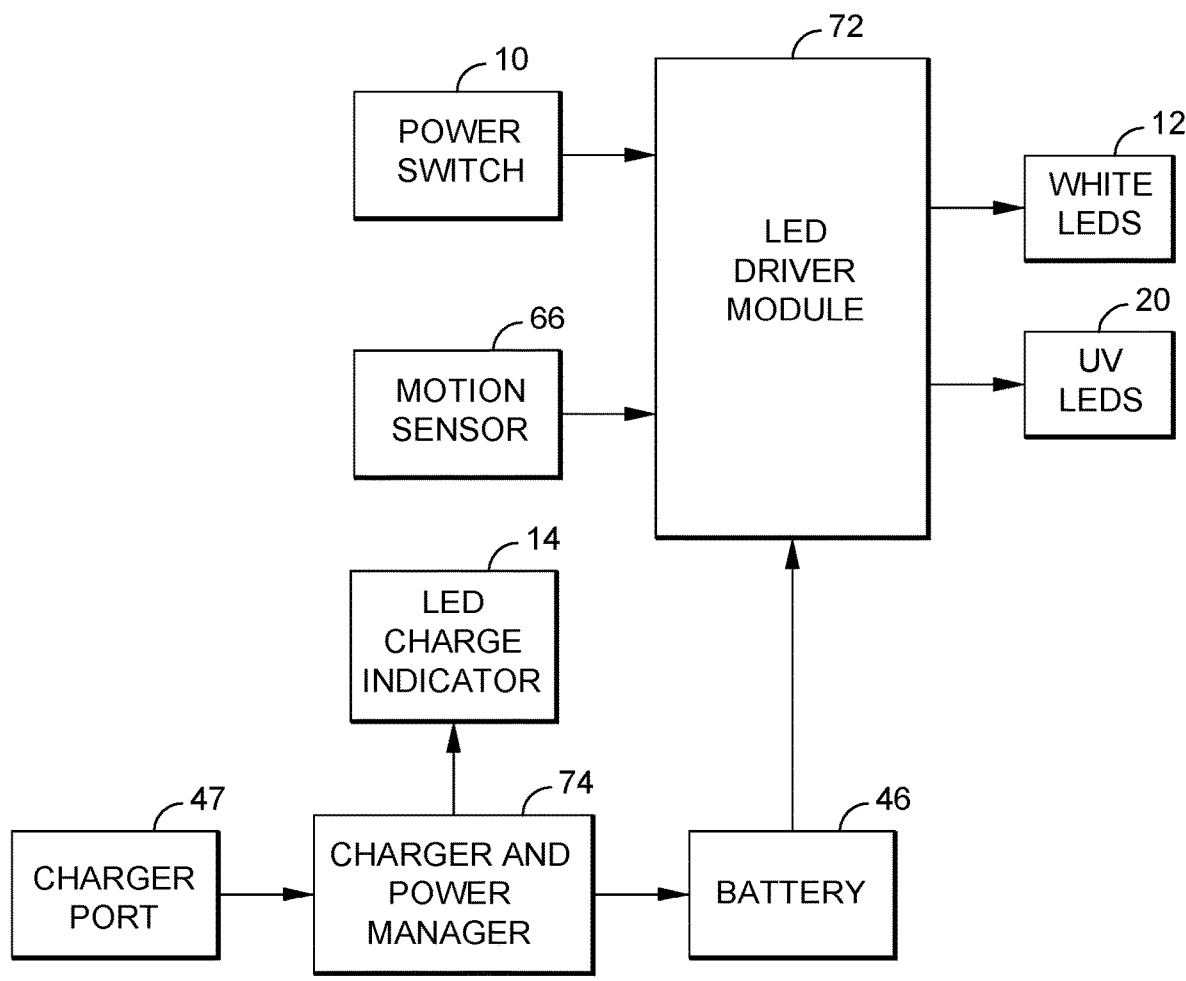
FIG. 7 is a schematic view of the LED lamp showing circuit components for operating the disclosed LED lamp.

Referring particularly to FIG. 7, there is shown a schematic diagram of the electronic components of the LED lamp 2. The lamp 2 incudes at least one white LED 12 and at least one UV LED 20. The white LEDs 12 on the lamp are activated by a power switch 10 to generate a signal received by an LED driver module 72 that drives the LEDs 12. When the lamp 2 is powered is on, and white LEDs 12 are active, a motion sensor 66, in the form of an infrared induction sensor, detects motion and the LED driver module 72 receives a signal from the motion sensor 66 and activates UV LEDs 20, for a predetermined period of time. The period of time may be 15 seconds, the amount of time to cure or partially cure nail gel. Although a fifteen (15) second UV exposure is disclosed, it is understood that such time may be varied. Alternatively, in a further embodiment, the lamp 2 may be powered on with a touch of switch 10, where the white LEDs are not active, but power is provided to the lamp and the sensor 66 is active and UV LEDs 20 are activated upon the sensor 66 detecting motion. Further touches of the switch 10 activate or deactivate the white LEDs 12 or multiple activations of the switch 10 may increase intensity or number of white LEDs 12, or to power down the lamp and sensor 66 is not active. A charger or charging port 47 receives power from an outside source such as standard 110v wall plug. The charger and power manger circuit 74 manages the power to charge the DC voltage battery 46. The power management IC 74 may comprise CS5090EA IC as may be manufactured by Shenzhen Heketai Digital Co., LTD. of Guangdong China with USB 5V input asynchronous switch boost charging with a working voltage of 3.6-6V, and BAT terminal to withstand voltage 30V internal integrated high voltage, maximum 1.5 A charging current and adjustable external resistance for charging current. Also IC 74 may have NTC function, reusable with enable boost charging efficiency of 90% to automatically adjust input current to match all adapters and support LED charging status indication 14 and 500 KHz switching frequency, built-in frequency jitter function, output overvoltage and short circuit protection and input undervoltage, overvoltage protection. Also the IC 74 has over temperature protection, IC temperature adaptive adjustment function and ESD 2KV. The battery 46 supplies power to the LED driver module 72. The IC 74 may drive the LED charge indicator 14 to indicate the level of charge of battery 46. The LED driver module 72 drives the white LEDs 12 and/or the UV LEDs 20 depending on the signal received from the switch 10 and/or motion sensor/detector 66. The LED driver module 72 may comprise an integrated microprocessor and LED driver to discern and detect signals from the switch 10 and/or sensor 66, or otherwise may include a separate microprocessor and LED driver components. For example, the LED driver module 72 may comprise a separate microprocessor, in electrical communication with two LED drivers one for each the LEDs 12 and the UV LEDs 20. Alternatively, the LED driver module 72 may comprise a separate microprocessor, in electrical communication with a single LED drivers capable of driving both the LEDs 12 and the UV LEDs 20. The LED driver module IC 72 may comprise model MT7282 ESOP8 as manufactured by Meixinsheng Technology of Beijing China. The LED driver module 72 may have an input voltage range of 2.5V to 40V with periodic overcurrent protection and built in 0.2Ω power MOS tube. The IC 72 may support the topology of boosting and reducing voltage. The LED driver module 72 may have LED over temperature protection using low equivalent series resistance (ESR) ceramic capacitors to ensure system stability. Also the IC 72 may have over voltage protection which may be externally adjustable and a fixed 450 kHz operating frequency. Also the IC 72 can have dithering functionality to reduce electromagnetic interference (EMI). The IC 72 may have low feed back voltage at 200 mV, adjustable soft start mechanism, and supports analog dimming and PWM dimming up to 10 KHz.

The above description is given by way of example, and not limitation. Given the above disclosure, one skilled in the art could devise variations that are within the scope and spirit of the disclosure herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A multiple lighting mode LED lamp comprising:
   a housing comprising:
      a lower face defining an outer perimeter and an opening positioned within the outer perimeter wherein a generally planar surface extends between the outer perimeter and the opening and wherein an aperture is formed in at least a portion of the generally planar surface;
      an interior wall extending from the opening to form a recess within the housing;
   a first illumination source comprising at least one white light LED positioned within the recess;
   a second illumination source comprising at least one UV LED positioned within the recess;
   a motion sensor positioned in alignment with the aperture formed in at least the portion of the generally planar surface such that a location for detecting motion is defined in front of the lower face of the housing;
   an LED driver module;
   a lamp base comprising;
      a power source in electrical communication with the LED driver module; and
      a manual switch in electrical communication with the LED driver module wherein the manual switch is positioned at a distance from the motion sensor such that a user can reach both the manual switch and the location for detecting motion from a fixed position; and
   a support having first and second ends, wherein the first end of the support is coupled to the base and wherein the second end of the support is coupled to the housing;
   wherein the manual switch generates a signal received by the LED driver module to activate the at least one white LED to operate the lamp in a first mode and wherein detection of motion by the motion sensor sends a signal to the LED driver module to activate the at least one UV LED to operate the lamp in a second mode.

2. The LED lamp of claim 1 wherein the support is an adjustable post.

3. The LED lamp of claim 1, wherein the motion sensor is an infrared induction sensor.

4. The LED lamp of claim 1 wherein the manual switch is a touch sensor.

5. The LED lamp of claim 1 wherein the LED driver module adjusts the intensity of the first illumination source based on the number of times the manual switch is activated.

6. The LED lamp of claim 5 wherein the LED driver module drives the first illumination source at 30% intensity with one activation of the manual switch.

7. The LED lamp of claim 5 wherein the LED driver module drives the first illumination source at 60% intensity with two activations of the manual switch.

8. The LED lamp of claim 5 wherein the LED driver module drives the first illumination source at 100% intensity with three activations of the manual switch.

9. The LED lamp of claim 1 wherein the detection of motion by the motion sensor initiates the LED driver module to drive the second illumination source to activate the at least one UV LED for a predetermined period of time before deactivating the at least one UV LED.

10. The LED lamp of claim 9 wherein the predetermined period of time is at least fifteen seconds.

11. The LED lamp of claim 9 wherein the predetermined period of time is approximately fifteen seconds.

12. The LED lamp of claim 1 wherein the lamp base has an acetone resistant finish.

13. The LED lamp of claim 1 wherein the power source is a battery.

14. The LED lamp of claim 13 wherein the battery is a rechargeable battery.

15. The LED lamp of claim 1 wherein the first illumination source comprises a plurality of white LEDs.

16. The LED lamp of claim 1 wherein the first illumination source comprises at least nine white LEDs.

17. The LED lamp of claim 1 wherein the second illumination source comprises a plurality of UV LEDs.

18. The LED lamp of claim 1 wherein the second illumination source comprises at least three UV LEDs.

19. A multiple lighting mode LED lamp comprising:
   a housing comprising;
      a lower face defining an outer perimeter and an opening positioned within the outer perimeter wherein a generally planar surface extends between the outer perimeter and the opening and wherein an aperture is formed in at least a portion of the generally planar surface;
      an interior wall extending from the opening to form a recess within the housing;
   at least one white light LED positioned within the housing;
   at least one UV LED positioned within the housing;
   a motion sensor positioned in alignment with the aperture formed in at least the portion of the generally planar surface such that a location for detecting motion is defined in front of the lower face of the housing;
   an LED driver module;
   a battery in electrical communication with the LED driver module;
   a switch in electrical communication with the LED driver module wherein the switch is positioned at a distance from the motion sensor such that a user can reach both the switch and the location for detecting motion from a fixed position;

a lamp base;

an adjustable support having first and second ends, wherein the first end of the support is coupled to the base and wherein the second end of the support is coupled to the housing;

wherein the switch generates a signal received by the LED driver module to activate the at least one white LED to operate the lamp in a first mode and wherein detection of motion by the motion sensor sends a signal to the LED driver module to activate the at least one UV LED to operate the lamp in a second mode.

20. The LED lamp of claim 19 wherein the LED driver is capable of adjusting the intensity of the first illumination source based on the number of activations of the switch.

21. The LED lamp of claim 19, wherein the motion sensor is an infrared induction sensor.

22. The LED lamp of claim 19 wherein the detection of motion by the motion sensor initiates the LED driver module to drive the at least one UV LED for a predetermined period of time before deactivating the at least one UV LED.

23. The LED lamp of claim 19 wherein the battery is a rechargeable battery.

24. The LED lamp of claim 1 wherein a transparent plastic is positioned within the lower face surface aperture.

25. The LED lamp of claim 24 wherein the motion sensor is placed behind the transparent plastic.

26. The LED lamp of claim 25 wherein the motion sensor is capable of detecting motion through the transparent plastic.

27. The LED lamp of claim 19 wherein a transparent plastic is positioned within the lower face surface aperture.

28. The LED lamp of claim 27 wherein the motion sensor is placed behind the transparent plastic.

29. The LED lamp of claim 28 wherein the motion sensor is capable of detecting motion through the transparent plastic.

\* \* \* \* \*